(12) United States Patent
Moon et al.

(10) Patent No.: US 8,570,468 B2
(45) Date of Patent: Oct. 29, 2013

(54) LIQUID CRYSTAL DISPLAY DEVICE AND METHOD OF FABRICATING THE SAME

(75) Inventors: Su Hwan Moon, Gyeongsangbuk-do (KR); Tae Hwan Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 260 days.

(21) Appl. No.: 11/637,815

(22) Filed: Dec. 13, 2006

(65) Prior Publication Data

US 2008/0002073 A1    Jan. 3, 2008

(30) Foreign Application Priority Data

Jun. 30, 2006  (KR) .................. 10-2006-0060096
Jun. 30, 2006  (KR) .................. 10-2006-0060097

(51) Int. Cl.
*G02F 1/133*    (2006.01)
*G02F 1/136*    (2006.01)

(52) U.S. Cl.
USPC ............................. 349/116; 349/42

(58) Field of Classification Search
USPC ......... 349/58–71, 42, 43, 110, 116, 153, 190; 345/102, 107, 104
See application file for complete search history.

(56) References Cited

U.S. PATENT DOCUMENTS

| | | | | |
|---|---|---|---|---|
| 5,062,690 A | * | 11/1991 | Whetten | 349/55 |
| 5,831,693 A | * | 11/1998 | McCartney et al. | 349/42 |
| 2001/0000676 A1 | * | 5/2001 | Zhang et al. | 349/12 |
| 2001/0002145 A1 | * | 5/2001 | Lee et al. | 349/58 |
| 2002/0011978 A1 | * | 1/2002 | Yamazaki et al. | 345/87 |
| 2002/0024097 A1 | * | 2/2002 | Joo | 257/359 |
| 2003/0137485 A1 | * | 7/2003 | Wei et al. | 345/102 |
| 2005/0082968 A1 | * | 4/2005 | Choi et al. | 313/506 |
| 2005/0156261 A1 | * | 7/2005 | Nishikawa et al. | 257/431 |
| 2005/0179682 A1 | * | 8/2005 | Shin et al. | 345/207 |
| 2005/0213799 A1 | * | 9/2005 | Sawano | 382/124 |
| 2006/0187367 A1 | * | 8/2006 | Abileah et al. | 349/37 |
| 2008/0231768 A1 | * | 9/2008 | Okabe | 349/25 |

FOREIGN PATENT DOCUMENTS

JP    2002-062856 A    2/2002
KR    10-2005-0036246 A    4/2005

OTHER PUBLICATIONS

KIPO—Office Action—Korean Patent Application No. 10-2006-0060096—Dated Aug. 22, 2012.

* cited by examiner

*Primary Examiner* — Jessica M Merlin
(74) *Attorney, Agent, or Firm* — Morgan, Lewis & Bockius LLP

(57) ABSTRACT

A liquid crystal display device and a method of fabricating a liquid crystal display device is provided. A liquid crystal display device includes a first substrate; a second substrate; a liquid crystal layer interposed between the first substrate and the second substrate; and a light sensor, formed on the first substrate, to sense a capacitance to output an electrical signal such that the capacitance varies with an intensity of light. A method of fabricating a liquid crystal display includes forming a thin film transistor, a pixel electrode electrically connected with the thin film transistor, and a light sensor on a first substrate; providing a second substrate on which a color filter and a black matrix are formed; and forming a liquid crystal layer between the first substrate and the second substrate.

7 Claims, 8 Drawing Sheets

LIQUID CRYSTAL DISPLAY DEVICE AND METHOD OF FABRICATING THE SAME

The present invention claims the benefit of Korean Patent Application No. 2006-60096 filed in Korea on Jun. 30, 2006, and No. 2006-60097 filed in Korea on Jun. 30, 2006, which is hereby incorporate by reference.

BACKGROUND OF THE INVENTION

1. Field of the Invention

The present invention relates to a liquid crystal display (LCD) device, and more particularly, to an LCD device and method of fabricating the same that controls the brightness of a backlight depending on the intensity of an external light.

2. Discussion of the Related Art

An LCD device is a flat panel display device considered to be a next generation display device because of the advantages including slim size, lightweight, low power consumption, high picture quality, and mass production yield. The LCD device includes a liquid crystal panel and a backlight in which the liquid crystal panel includes a thin film transistor (TFT) array substrate, a color filter array substrate, and a liquid crystal layer interposed between the two substrates, and the backlight provides light to the liquid crystal layer. The LCD device displays an image on the panel by controlling light transmittance through the liquid crystal layer using the optical anisotropy of liquid crystal molecules in the liquid crystal layer.

The backlight wastes a power in a dark environment because it provides a constant light brightness to the liquid crystal panel. In the dark environment, a user has a relatively high recognition degree and an extra amount of light is not required.

SUMMARY OF THE INVENTION

Accordingly, the present invention is directed to a liquid crystal display device and method of fabricating the same that substantially obviates one or more problems due to limitations and disadvantages of the related art.

An object of the present invention is to provide a light sensor that correctly senses the intensity of external light surrounding the LCD device and adjust the brightness of a backlight to decrease unnecessary power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described a liquid crystal display device and method of fabricating the same includes a liquid crystal display device having a first substrate; a second substrate; a liquid crystal layer interposed between the first substrate and the second substrate; and a light sensor, formed on the first substrate, to sense a capacitance to output an electrical signal such that the capacitance varies with an intensity of light.

In another aspect, a method of fabricating a liquid crystal display includes forming a thin film transistor, a pixel electrode electrically connected with the thin film transistor, and a light sensor on a first substrate; providing a second substrate on which a color filter and a black matrix are formed; and forming a liquid crystal layer between the first substrate and the second substrate.

In another aspect, a method of fabricating a liquid crystal display device includes defining a display area and a non-display area on a first substrate and a second substrate; forming a light sensor on the first substrate in the non-display area, the light sensor outputs a signal based on an intensity of light; forming a seal pattern on the first substrate or the second substrate in the non-display area; and attaching the first substrate and the second substrate using the seal pattern and forming a liquid crystal layer between the first and second substrates in the display area.

In another aspect, a method of fabricating a liquid crystal display includes defining a display are and a non-display area on a first substrate and a second substrate, wherein a plurality of pixel regions are formed on the first substrate in the display area; forming a thin film transistor and a light sensor on the first substrate, wherein the thin film transistor is formed in each of a respective pixel region and the light sensor is formed at a respective portion of the non-display area, such that the light sensor outputs a signal based on an intensity of light; and attaching the first substrate and the second substrate and forming a liquid crystal layer between the first and second substrates in the display area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
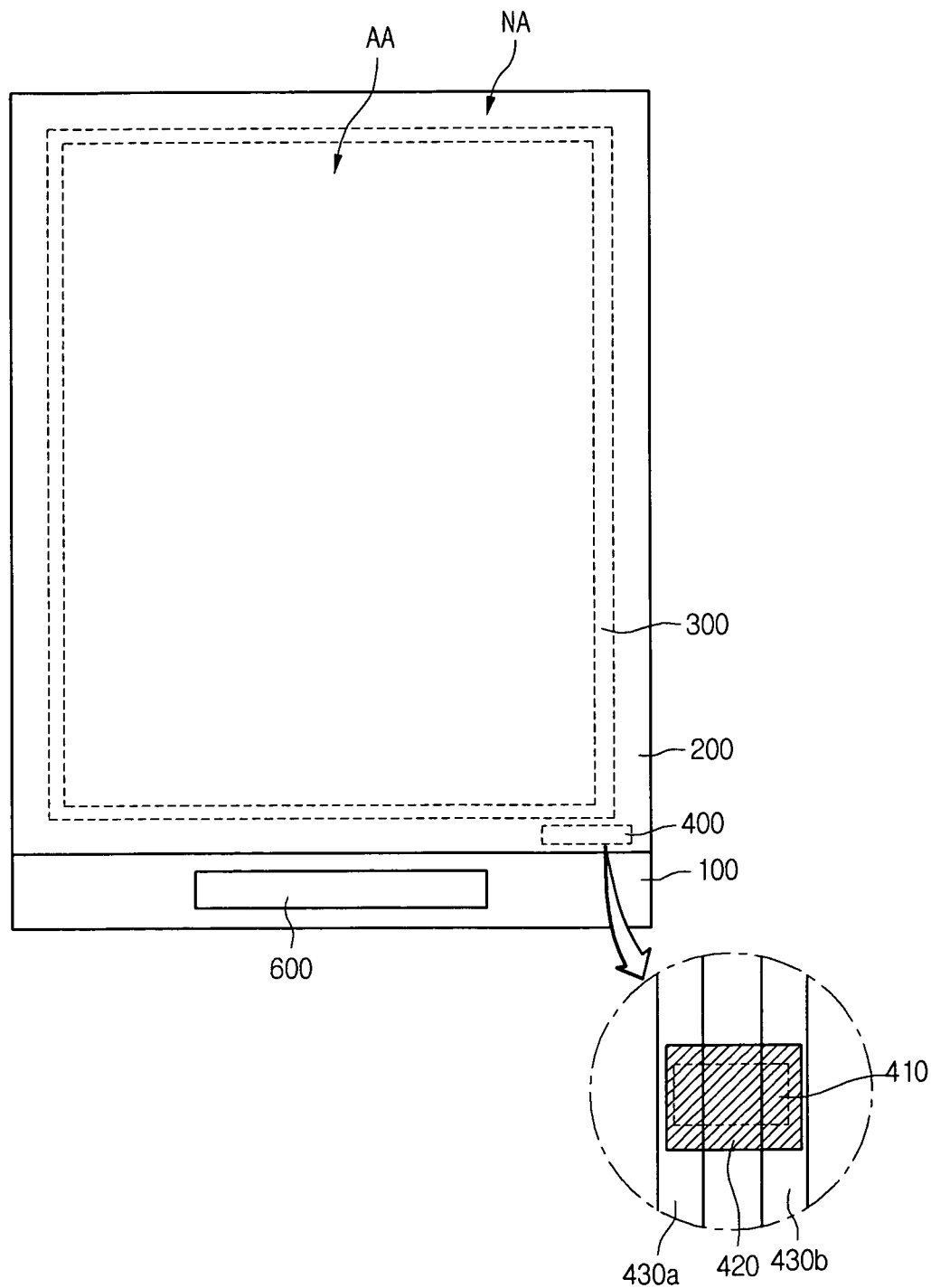
FIG. 1A is a top view showing an LCD device according to a first exemplary embodiment of the present invention.
Figure 1B:
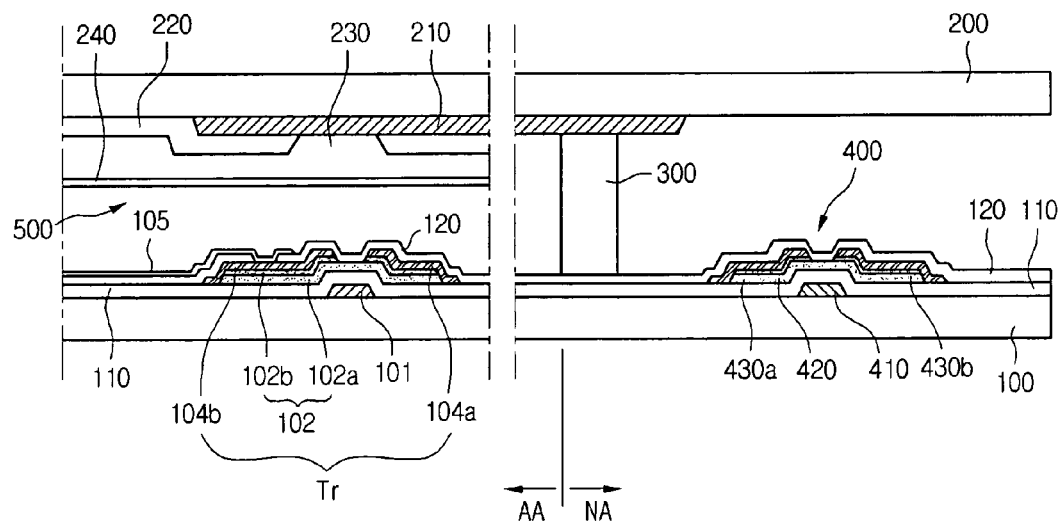
FIG. 1B is a section view showing the LCD device of the first exemplary embodiment of the present invention.

FIGS. 1A and 1B are views illustrating an LCD device according to a first exemplary embodiment of the present invention. In particular, FIG. 1A is a plane view of the first exemplary LCD device, and FIG. 1B is a partial sectional view taken along a predetermined line of FIG. 1A.

As shown in FIGS. 1A and 1B, the first exemplary LCD device is divided into a display area 'AA' and a non-display area 'NA', and includes first and second substrates 100 and 200. The first and second substrates 100 and 200 are spaced apart by a predetermined distance from each other, a seal pattern 300 securely attaching the first and second substrates 100 and 200, and a liquid crystal layer 500 is interposed between the first and second substrates 100 and 200. Herein, the display area 'AA' corresponds to an area where an image is displayed, and the non-display region 'NA' corresponds to a peripheral area of the display area 'AA' where no image is displayed. A plurality of gate lines and a plurality of data lines are formed on the first substrate 100. The plurality of data and gate lines intersects each other to define a plurality of pixel regions in the display area 'AA' on the first substrate 100. A gate insulating layer 110 is interposed between the plurality of gate lines and the plurality of data lines.

One thin film transistor 'Tr' and a pixel electrode 105 that connects with the thin film transistor 'Tr' electrically are formed in each of the plurality of pixel regions. The thin film transistor 'Tr' includes a first gate electrode 101 branched from a respective one of the plurality of gate lines, a gate insulating layer 110 formed over a first gate electrode 101, a first semiconductor layer 102 formed on the gate insulating layer 110, and a first source/drain electrode 104a, 104b formed on the first semiconductor layer 102. The first semiconductor layer 102 includes an active layer 102a formed of amorphous silicon and an ohmic contact layer 102b formed of impurity-doped amorphous silicon. Further, a passivation layer 120 is formed on an entire upper surface of the first substrate 100 including the thin film transistor 'Tr'. The passivation layer 120 may include a silicon nitride layer, a silicon oxide layer, or a stack layer of silicon nitride layer/silicon oxide layer.

A gate pad section and a data pad section that electrically connect with an external circuit are formed on the first substrate 100 at a portion corresponding to the non-display area 'NA'. A driver 600 is connected with the gate pad section and the data pad section, and the driver 600 can be formed in the non-display area 'NA'. In addition, the driver 600 may be connected with the gate pad and data pad sections through a flexible printed circuit.

A light sensor 400 that senses an intensity of an external light and outputs an electrical signal is formed on the first substrate 100 in the non-display area 'NA'. A backlight is disposed at a rear side of the first substrate 100. Brightness of the backlight is adjusted according to the electrical signal output from the light sensor 400 to control a power consumption. For example, when an intensity of light surrounding the LCD device is low (i.e., dark), the brightness of the backlight is reduced, thereby decreasing the power consumption.

The light sensor 400 includes a second gate electrode 410 formed on the first substrate 100, the gate insulating layer 110 formed on the second gate electrode 410, a second semiconductor layer 420 formed on the gate insulating layer 110, and a second source/drain electrode 430a, 430b formed on the second semiconductor layer 420. The second drain electrode 430b is connected with a light sensor pad (not shown) and the light sensor pad is connected with an external circuit, i.e., a backlight driver to output a signal for controlling the brightness of the backlight. The light sensor pad can be formed of the same conductive material as the second gate electrode 410 or the second source/second drain electrode 430a and 430b.

The second semiconductor layer 420 can be formed of a material (i.e., amorphous silicon) having an electrical characteristic that the current flowing through the light sensor 400 varies with the intensity of an external light. In other words, when the intensity of the external light is strong, the intensity of the current flowing through the second source/second drain electrode 430a/430b of the light sensor 400 increases, and when the intensity of the external light is weakened, the intensity of the current flowing through the second source/second drain electrode 430a/430b of the light sensor 400 decreases. Accordingly, the brightness of the backlight can be adjusted depending on the intensity of the current flowing through the second source/second drain electrode 430a/430b of the light sensor 400.

A passivation layer 120 is also formed on the light sensor 400. The passivation layer 120 formed on the light sensor 400 extends from the display area 'AA' to the non-display area 'NA'. Since the light sensor 400 is positioned outside a seal pattern 300 and exposed to an outside, the passivation layer 120 functions to prevent the contamination of the light sensor 400.

A color filter 220 and a black matrix 210 are formed on the second substrate 200 at a portion corresponding to the display area 'AA'. The color filter 220 is disposed corresponding to a light transmission region of each pixel region and the black matrix 210 is disposed corresponding to a boundary between each pixel region and an opaque region of the each pixel region. The opaque region is a region where the gate line, the data line and the thin film transistor are formed. In addition, an overcoat layer may be optionally formed over the black matrix 210 and the color filter 220 to compensate for a height difference of the color filter 220 and the black matrix 210. A transparent common electrode 240 is formed on the overcoat layer 230. In addition, the common electrode 240 may be extended to the non-display area 'NA'. The black matrix 210 may be partially formed on the second substrate at a portion in the non-display area 'NA'.

Seal pattern 300 is formed on the first substrate 100 or the second substrate 200 in the non-display area 'NA'. The seal pattern 300 is formed on the outermost peripheral edge of the display area 'AA' to securely attach the first substrate 100 and the second substrate 200. The liquid crystal layer 500 is disposed inside the seal pattern 300. Since the light sensor 400 is positioned outside the seal pattern 300 and the liquid crystal layer 500 is not disposed over the light sensor 400, the liquid crystal layer 500 does not interfere the light incident on the light sensor 400. And, the light sensor 400 is not limited to the exemplary location and can be formed around the driver (i.e., adjacent to the data pad section or the gate pad section).

FIGS. 2A through 2E are sectional views illustrating first exemplary processes of fabricating the LCD device according to the first exemplary embodiment of the present invention.

Figure 2A:
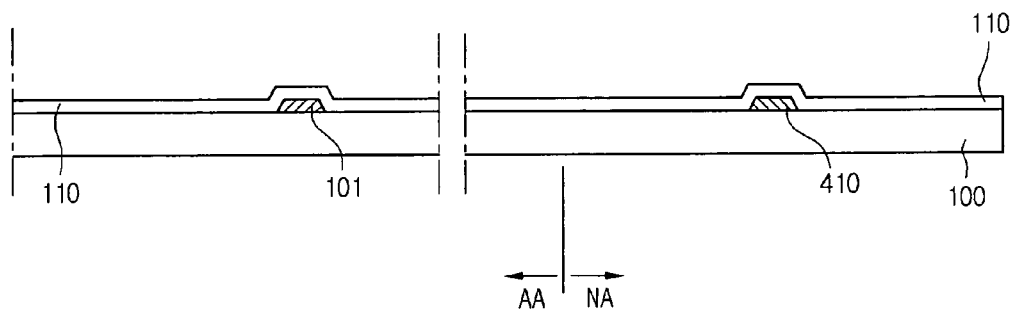
FIGS. 2A through 2E are sectional views illustrating first exemplary processes of fabricating the LCD device according to the first embodiment of the present invention.

As shown in FIG. 2A, a first substrate 100 including a display area 'AA' and a non-display area 'NA' is prepared. A first conductive layer is formed on the first substrate 100 and then patterned to form a first gate electrode 101 and a second gate electrode 410. The first gate electrode 101 is formed in the display area 'AA', and the second electrode 410 is formed in the non-display area 'NA'. The first conductive layer can be formed by a sputtering method or a vacuum evaporation method. At this time, the first conductive layer can be formed of Al, Mo, Cu, AlNd, Ti, Ca, Ni, or alloys of respective elements.

A gate insulating layer 110 is formed on an entire upper surface of the first substrate 100 including the first gate electrode 101 and the second gate electrode 410. The gate insulating layer 110 may be formed of an oxide silicon layer, a nitride silicon layer, or a stack layer of oxide silicon layer/nitride silicon layer. At this time, the gate insulating layer 110 can be formed by a chemical vapor deposition (CVD) method or a vacuum evaporation method.

Figure 2B:
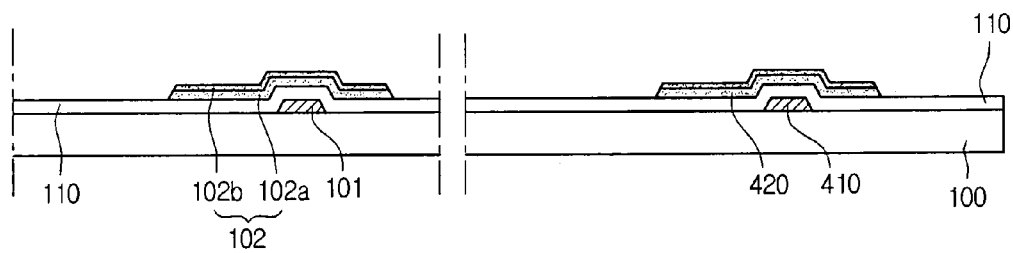

As shown in FIG. 2B, a first semiconductor layer 102 and a second semiconductor layer 420 respectively corresponding to the first gate electrode 101 and the second gate electrode 410 are formed on the gate insulating layer 110. The first semiconductor layer 102 includes an active layer 102a formed of amorphous silicon and an ohmic contact layer 102b formed of impurity-doped amorphous silicon. The second semiconductor layer 420 also includes an active layer formed of amorphous silicon and an ohmic contact layer formed of impurity-doped amorphous silicon. The amorphous silicon of the second semiconductor layer 420 has an electrical characteristic that the current flowing through the light sensor 400 varies with the intensity of the external light. The first and the second semiconductor layers 102 and 420 can be formed by a CVD method or a sputtering method. In addition, a half-tone mask patterning process or a diffraction mask patterning process can be used to form the first and second semiconductor layers 102 and 420 simultaneously.

Figure 2C:
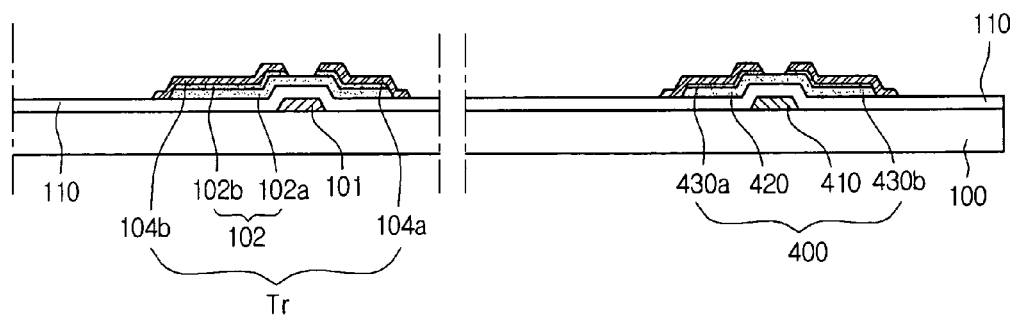

Referring to FIG. 2C, a second conducive layer is formed on an entire upper surface of the first substrate 100 including the first and second semiconductor layers 102 and 420, then patterned to form a first source/drain electrode 104a/104b over the first gate electrode 101 on the first semiconductor layer 102, and a second source/drain electrode 430a/430b over the second gate electrode 410 on the second semiconductor layer 420. The second conductive layer can be formed of Al, Mo, Cu, AlNd, Ti, Ca, Ni, or alloys of respective elements. At this time, the second conductive layer can be formed by a sputtering method or a vacuum evaporation method. And, the thin film transistor 'Tr' and the light sensor 400 can be formed on the first substrate 100.

Each of the first and second semiconductor layers 102 and 420 includes an active layer and an ohmic contact layer and an amorphous silicon layer. A second conductive layer is formed over the first substrate 100 including first and second semiconductor layers 102 and 420. Thereafter, the first source/drain electrodes 104a/104b and the second source/drain electrodes 430a/430b are formed simultaneously.

Figure 2D:
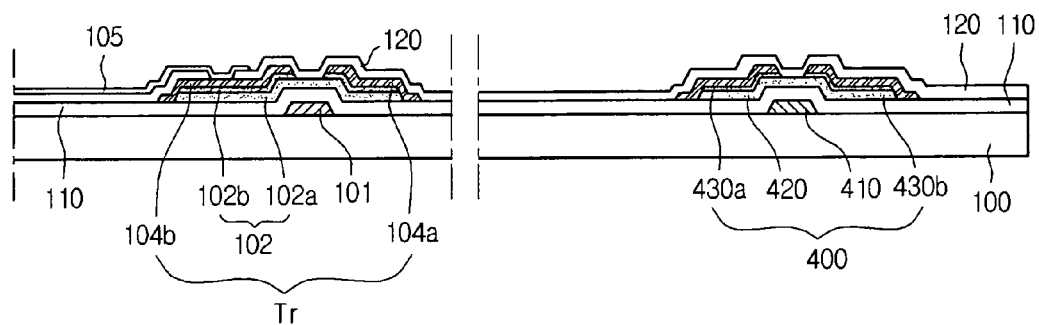

Referring to FIG. 2D, a passivation layer 120 is formed on an entire upper surface of the first substrate 100 including the thin film transistor 'Tr' and the light sensor 400. The passivation layer 120 is formed on the light sensor 400 to prevent the contamination of the light sensor 400 due to the exposure to the outside. The passivation layer 120 may be formed of a silicon nitride layer, a silicon oxide layer, or a stack layer of silicon oxide layer/silicon nitride layer. At this time, the passivation layer can be formed by a CVD method or a sputtering method. A contact hole exposing the first drain electrode 104b of the thin film transistor 'Tr' is defined through the passivation layer 120.

A third conductive layer is formed on an entire upper surface of the first substrate 100 including the thin film transistor 'Tr', then patterned to form a pixel electrode 105 that electrically connects with the thin film transistor 'Tr'. At the same time, a portion of the third conductive layer formed over the light sensor 400 is removed. The third conductive layer can be formed of a transparent conductive material, such as indium tin oxide (ITO) or indium zinc oxide (IZO). The third conductive layer can be formed by a sputtering method or a vacuum evaporation method.

Figure 2E:
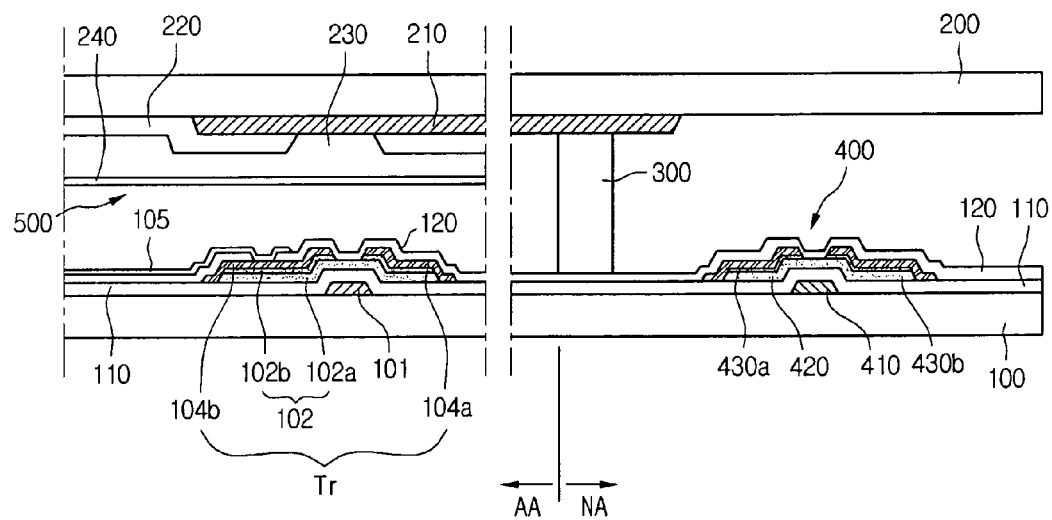

As shown in FIG. 2E, a second substrate 200 having a color filter 220 and a black matrix 210 formed thereon is prepared. An overcoat layer 230 is optionally formed on the color filter 220 and the black matrix 210. A common electrode 240 is formed on the overcoat layer 230. The common electrode 240 can be formed of a transparent electrode material, such as indium tin oxide (ITO) or indium zinc oxide (IZO). A seal pattern 300 is formed on the non-display area 'NA' of the first substrate 100 or the second substrate 200, then the first substrate 100 and the second substrate 200 are securely attached to each other by the seal pattern 300. Thereafter, a liquid crystal layer 500 is interposed between the first and second substrates 100 and 200 inside the seal pattern 300. Alternatively, the first substrate 100 and the second substrate 200 may be attached after the liquid crystal layer is disposed on the first substrate 100 or the second substrate 200. In the first exemplary embodiment, the liquid crystal layer 500 is disposed inside the seal pattern 300.

At this time, the seal pattern 300 is formed such that the light sensor 400 is positioned outside the seal pattern 300, thus the liquid crystal layer is not formed on the light sensor 400. Accordingly, the light sensor 400 is able to sense the surrounding brightness, and the brightness of the backlight can be controlled by the electrical signal generated by the light sensor 400 while determining the brightness of the surrounding. Thereafter, an assembly process (not shown in the drawings) to fabricate the exemplary LCD device is performed by putting together the first and second substrates, the backlight, a support frame, and a top case.

Accordingly, it is possible to fabricate the LCD device capable of controlling the power consumption of the backlight, hence controlling an overall power consumption of the LCD device. In addition, since the light sensor 400 is formed outside the seal pattern 300, the influence of the liquid crystal layer 500 is negligent while determining the level of current flowing through the light sensor 400. Furthermore, since the light sensor 400 is formed outside the seal pattern 300, the size of the light sensor 400 is not particularly limited. Accordingly, the light sensor 400 can be formed in a larger size, thereby enhancing the sensitivity of the light sensor 400.

Figure 3A:
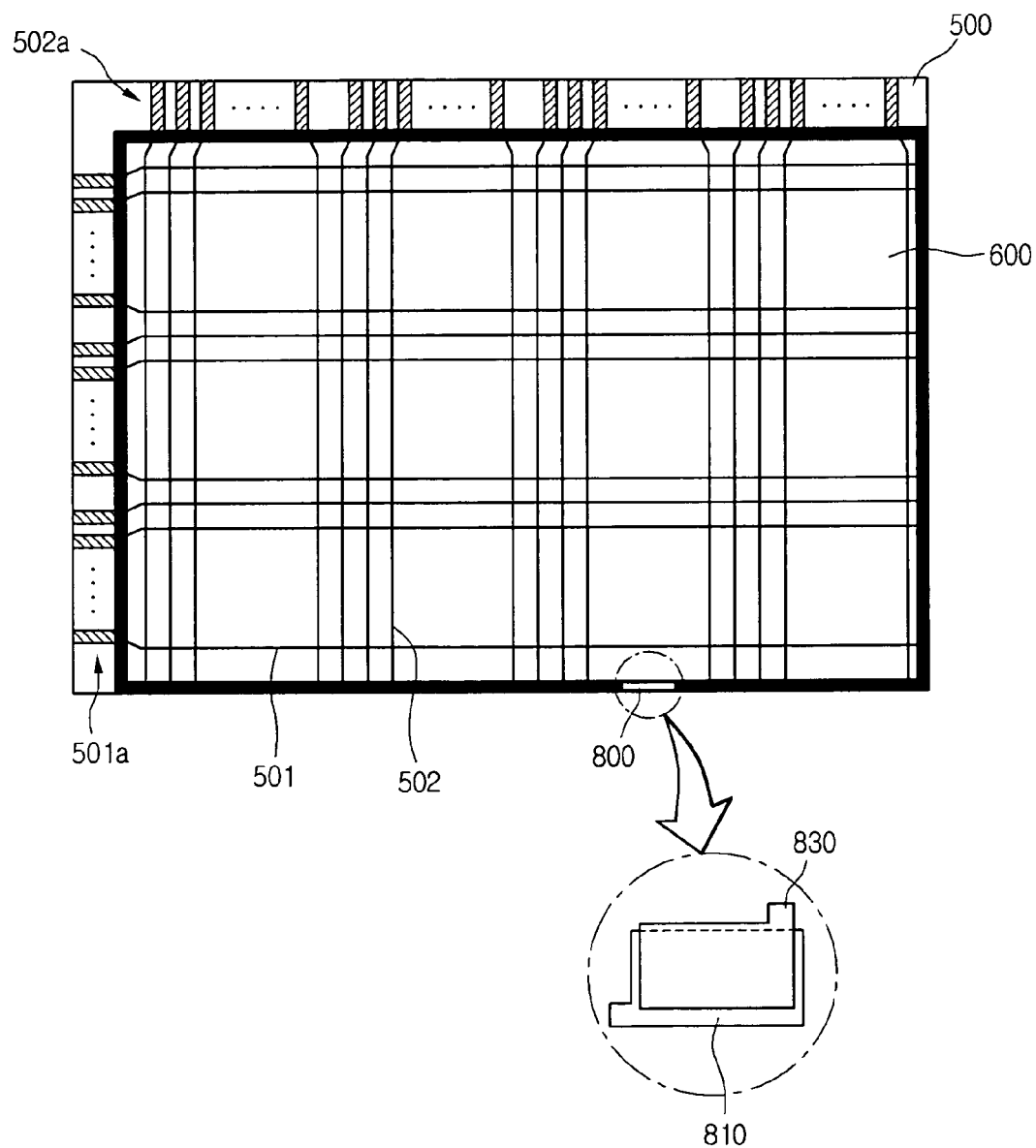
FIG. 3A is a top view showing an LCD device according to a second exemplary embodiment of the present invention.
Figure 3B:
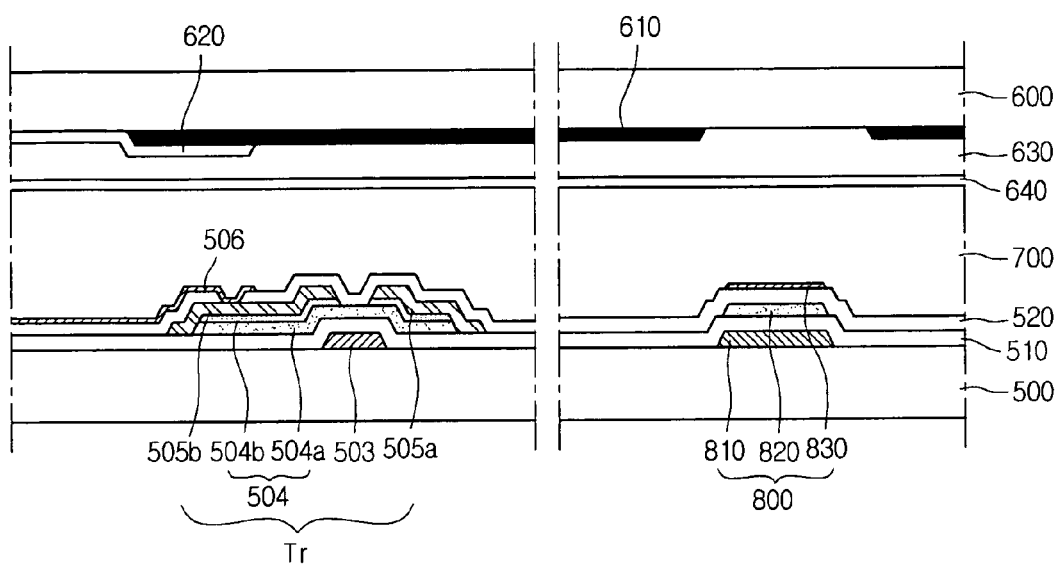
FIG. 3B is a section view showing the LCD device according to the second exemplary embodiment of the present invention.

FIGS. 3A and 3B are views illustrating an LCD device according to a second exemplary embodiment of the present invention. In particular, FIG. 3A is a plane view of the second exemplary LCD device, and FIG. 3B is a partial sectional view taken along a predetermined line of FIG. 3A.

Referring to FIG. 3A, a second exemplary LCD device includes first and second substrates 500 and 600 disposed spaced apart by a predetermined distance from each other, a liquid crystal layer 700 interposed between the first and second substrates 500 and 600, and the light sensor 800 formed at a respective portion on the first substrate 500 to sense a static capacitance (static capacitance is defined as a capacitance formed between a lower electrode 810 and an upper electrode 830) when light is incident on the sensor 800 and to output an electrical signal. In addition, the sensor 800 is formed at a respective portion underneath a peripheral of a second substrate 600. The sensor 800 senses the changes in static capacitance according to an intensity of external light incident on the sensor 800.

As shown in FIG. 3A, a plurality of gate lines 501 and a plurality of data lines 502 are disposed intersecting each other on a first substrate 500 to define a plurality of pixel regions. A gate pad section 501a is formed at the end of each of the plurality of gate lines 501 and a data pad section 502a is formed at the end of each of the plurality of data lines 502. The gate pad section 501a includes a plurality of gate pads and the data pad section 502a includes a plurality of data pads. Each of the pad sections 501a and 502a can be electrically connected to a printed circuit board "PCB" (not shown). The PCB is an external circuit part formed by a tape automated bonding (TAB) process using a tape carrier package (TCP).

Next, as shown in FIG. 3B, the light sensor 800 includes a lower electrode 810, an upper electrode 830, and a dielectric layer 820 disposed between the two electrodes 810 and 830. The lower electrode 810 is formed on the first substrate 500, and then a first insulating layer 510 is formed on the first substrate 500 including the lower electrode 810. The dielectric layer 820 is formed on the first insulating layer 510 at a portion corresponding to the lower electrode 810. The second insulating layer 520 is formed on the first substrate 500 including the dielectric layer 820. The upper electrode 830 is formed on the second insulating layer 520 at a portion corresponding to the dielectric layer 820. The upper electrode 830 overlaps the dielectric layer 820 and the lower electrode 810.

The lower electrode is formed of a conductive material. The dielectric layer 820 is formed of a material having a permittivity that varies with the intensity of light incident thereon. In addition, the dielectric layer 820 can be formed of amorphous silicon. The upper electrode 830 can be formed of a transparent conductive material, such as indium tin oxide (ITO) or indium zinc oxide (IZO), so that light can transmit through the dielectric layer 820. In the second exemplary embodiment of the present invention, the static capacitance varies directly as the dielectric constant of a dielectric layer 820 changes. However, the static capacitance does not vary as the voltage between the lower electrode 810 and the upper electrode 830 changes.

In an exemplary light sensor 800, as energy from light irradiated on the amorphous silicon increases, the permittivity of the amorphous silicon decreases. As a result, the static capacitance of the light sensor 800 decreases. In this manner, the light sensor 800 outputs an electrical signal to control the backlight.

Specifically, when light surrounding the second exemplary LCD device is bright, the light sensor 800 increases the intensity of the light emitting from the backlight, and the liquid crystal panel becomes brighter. On the other hand, when light surrounding the second exemplary LCD device is dark, the light sensor 800 decreases the intensity of the light emitting from the backlight, and the liquid crystal panel becomes darker. Since the light sensor 800 senses the brightness of the surrounding to control the brightness of the backlight, the power consumption of the backlight can be decreased. Accordingly, a total power consumption of the second exemplary LCD device can be minimized.

Although not specifically shown in FIGS. 3A and 3B, a first insulating layer 510 is interposed between the plurality of gate lines 501 and the plurality of data lines 502. The first insulating layer 510 can be formed of a silicon nitride layer, a silicon oxide layer, or a stack of silicon nitride layer/silicon oxide layer.

As shown in FIG. 3B, at least one thin film transistor 'Tr' is formed at a respective intersection of the plurality of gate lines 501 and the plurality of data lines 502. The thin film transistor 'Tr' includes a gate electrode 503 branched from a respective one of the plurality of gate lines 501, a semiconductor layer 504 formed on the first insulating layer 510 at a portion corresponding to the gate electrode 503, and a source/drain electrode 505a, 505b formed on the semiconductor layer 504. The gate electrode 503 can be formed of the same conductive material as that of the lower electrode 810. The semiconductor layer 504 includes an active layer 504a formed of amorphous silicon and an ohmic contact layer 504b formed of impurity-doped amorphous silicon.

A second insulating layer 520 is formed on an entire upper surface of the first substrate 500 including the thin film transistor 'Tr'. The second insulating layer 520 can be formed of a silicon nitride layer, a silicon oxide layer, or a stack of silicon nitride layer/silicon oxide layer.

Meanwhile, a color filter 620 and a black matrix 610 are formed on the second substrate 600. The black matrix 610 is formed to overlap a pixel region. The black matrix 610 can be formed extending to the peripheral region of the second substrate 600. An overcoat layer 630 can be formed to compensate for a height difference generated by the color filter 620 and the black matrix 610. A transparent common electrode 640 is formed on the overcoat layer 630.

As shown in FIG. 3B, an opening is formed at a respective peripheral portion of the black matrix 610 exposing a portion of first substrate 500. The light sensor 800 can be positioned underneath this opening, and thus, an external light can irradiate onto the light sensor 800. While the described second exemplary embodiment provides the light sensor 800 below the black matrix 610, the location of the light sensor 800 is not limited thereto.

Figure 4A:
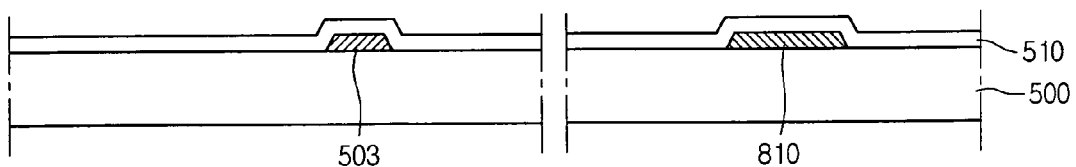
FIGS. 4A through 4E are sectional views illustrating second exemplary process of fabricating the LCD device according to the second exemplary embodiment of the present invention.

FIGS. 4A through 4E are sectional views illustrating second exemplary processes of fabricating the LCD device according to the second exemplary embodiment of the present invention. Referring to FIG. 4A, a first substrate 500 is prepared. A first conductive layer is formed on the first substrate 500 and then patterned to form a gate electrode 503 and a lower electrode 810. The first conductive layer can be formed by a sputtering method or a vacuum evaporation method. In addition, the first conductive layer can be formed of Al, Mo, Cu, AlNd, Ti, Ca, Ni, or alloys of respective elements.

A first insulating layer 510 is formed on an entire upper surface of the first substrate 500 including the gate electrode 503 and the lower electrode 810. The first insulating layer 510 can be formed of a silicon oxide layer, a silicon nitride layer, or a stack of silicon oxide layer/silicon nitride layer. At this time, the first insulating layer 510 can be formed by a chemical vapor deposition (CVD) method or a vacuum evaporation method.

Figure 4B:
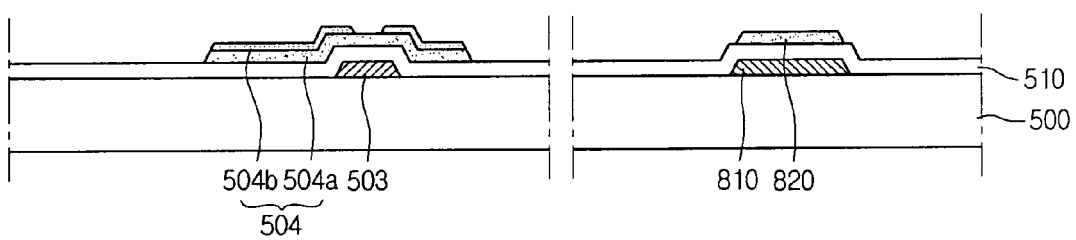

Next, as shown in FIG. 4B, a semiconductor layer 504 and a dielectric layer 820 are respectively formed on the first insulating layer 510 at portions corresponding to the gate electrode 501 and the lower electrode 810, respectively. At this time, the semiconductor layer 504 and the dielectric layer 820 can be formed by a CVD method or a sputtering method. In addition, a patterning process using a half-tone mask or a diffraction mask can be performed to form the semiconductor layer 504 and the dielectric layer 820 simultaneously.

Figure 4C:
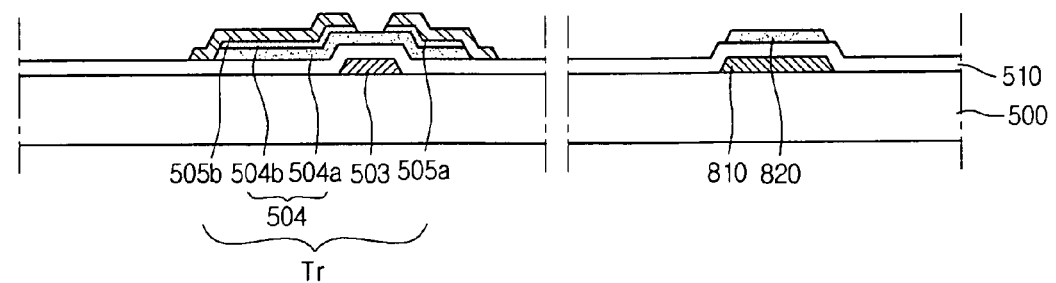

Next, as shown in FIG. 4C, a second conducive layer is formed on an entire upper surface of the first substrate 500 including the semiconductor layer 504 and the dielectric layer 820. Thereafter, source/drain electrodes 505a/505b are formed on the semiconductor layer 504 by patterning. The second conductive layer can be formed of Al, Mo, AlNd, Ti, Ca, Cu, or alloys of respective elements. The second conductive layer can be formed by a sputtering method or a vacuum evaporation method.

Figure 4D:
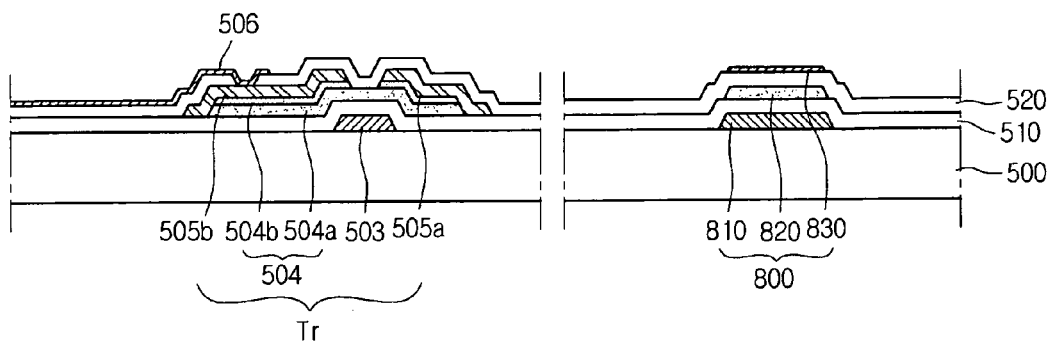

Referring to FIG. 4D, a second insulating layer 520 is formed on an entire upper surface of the first substrate 100 including the thin film transistor 'Tr' and the dielectric layer 820. The second insulating layer 520 can be formed of a silicon nitride layer, a silicon oxide layer, or a stack of silicon oxide layer and silicon nitride layer. At this time, the second insulating layer 520 can be formed by a CVD method or a sputtering method. A contact hole exposing a portion of the drain electrode 505b of the thin film transistor 'Tr' is defined through the second insulating layer 520.

A third conductive layer is formed on an entire upper surface of the first substrate 500 including the thin film transistor 'Tr', and then patterned to form a pixel electrode 506 and the upper electrode 830 at respective portions on the second insulating layer 520. The pixel electrode 506 is formed in each of the pixel regions and electrically connects with the thin film transistor 'Tr' through the contact hole defined. The third conductive layer can be formed of a transparent conductive material, such as indium tin oxide (ITO) or indium zinc oxide (IZO). The third conductive layer can be formed by a sputtering method or a vacuum vaporization method.

Figure 4E:
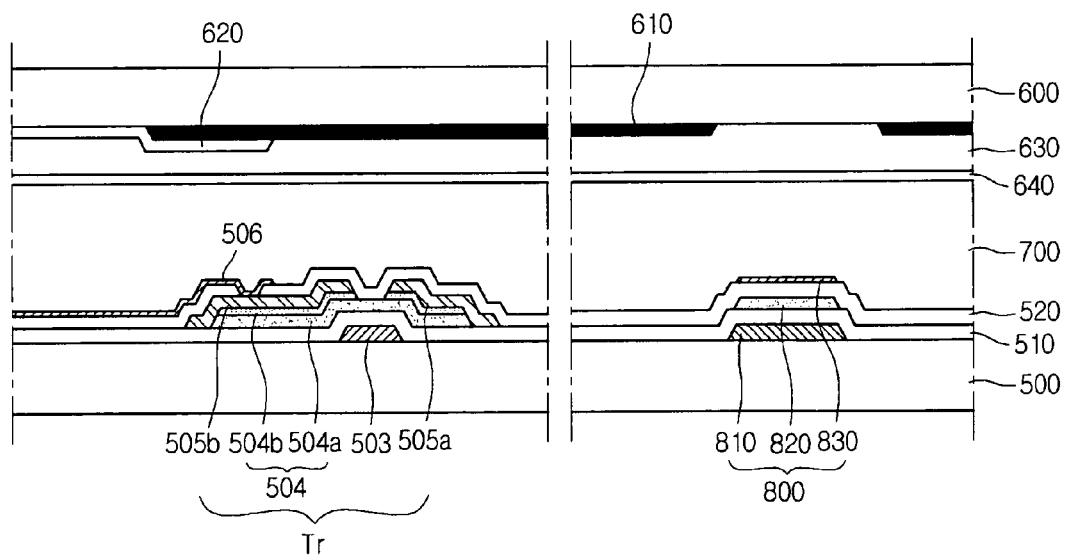

Next, as shown in FIG. 4E, a second substrate 600 having a color filter 620 and a black matrix 610 formed thereon is provided. In addition, an overcoat layer 630 can be formed on the color filter 620 and the black matrix 610. A transparent common electrode 640 is formed on the overcoat layer 630. The common electrode 640 can be formed of a transparent electrode material, such as indium tin oxide (ITO) or indium zinc oxide (IZO).

The first substrate 500 and the second substrate 600 are attached to each other. Thereafter, a liquid crystal layer 700 is formed between two substrates 500 and 600. Alternatively, the first substrate 500 and the second substrate 600 may be attached after the liquid crystal layer 700 is formed on the first substrate 500 or the second substrate 600. Thereafter, an assembly process (not shown in the drawings) to fabricate the exemplary LCD device is performed by putting together the first and second substrates, the backlight, a support frame, and a top case.

As discussed above with respect to FIGS. 3A through 4E, the light sensor 800 formed on the first substrate 500 senses the intensity of external light to control the brightness of the backlight. Since the light sensor 800 is exposed to the external surrounding through the opening defined through the black matrix 610, light can directly incident on the light sensor 800. As a result, an overall power consumption of the exemplary LCD device can be appropriately controlled. Furthermore, since the light sensor 800 is formed at a non-display region on the first substrate 500, the size and the number of the light sensor is not particularly limited.

As described above, according to the present invention, the light sensor senses the brightness of the surrounding to control the brightness of the backlight, thereby controlling the power consumption of the backlight and further controlling the total power consumption of the LCD device. Since the light sensor is formed exposing to the surrounding, the external light is directly incident on the light sensor. Thus, correct brightness of the surrounding can be determined. Furthermore, the size and number of the light sensors are not particularly limited. Sensitivity of the light sensor can be enhanced.

It will be apparent to those skilled in the art that various modifications and variations can be made in the liquid crystal display device and method of fabricating the same without departing from the spirit or scope of the invention. Thus, it is intended that the present invention covers the modifications and variations of this invention provided they come within the scope of the appended claims and their equivalents.

What is claimed is:

1. A liquid crystal display device having a display area and a non-display area, comprising:
   a first substrate;
   a second substrate having a color filter and a black matrix;
   a liquid crystal layer interposed between the first substrate and the second substrate;
   a seal pattern attaching the first and second substrates;
   a light sensor formed on the first substrate in the non-display area to sense an intensity of an external light; and
   a backlight disposed on a rear side of the first substrate and having a brightness thereof controlled by the light sensor,
   wherein the light sensor includes a gate electrode formed on the first substrate, a gate insulating layer formed on the gate electrode, a semiconductor layer formed on and directly in contact with the gate insulation layer, source and drain electrodes formed on and directly in contact with the semiconductor layer, and a passivation layer formed on the source and drain electrodes,
   wherein the seal pattern is formed on the outermost peripheral edge of the display area to securely attach the first substrate and the second substrate,
   wherein the liquid crystal layer is disposed inside the seal pattern and is not disposed over the light sensor,
   wherein the light sensor is positioned outside the seal pattern, adjacent the black matrix, and exposed to an outside,
   wherein the drain electrode of the light sensor is connected with a light sensor pad and the light sensor pad is connected with a backlight driver to output a signal for controlling the brightness of the backlight,
   wherein the light sensor pad is formed of the same conductive material as the gate electrode or the source and drain electrodes and is formed of the same process as the gate electrode or the source and drain electrodes,
   wherein the second semiconductor layer comprises:
      an active layer of amorphous silicon, and
      an ohmic contact layer of impurity-doped amorphous silicon,
   wherein the light sensor is formed between the first substrate and the second substrate, and
   wherein the black matrix is formed on portions of the second substrate corresponding to both the non-display area and the display area.

2. The liquid crystal display device having a display area and a non-display area according to claim 1, wherein the gate insulating layer includes a silicon oxide layer, a silicon nitride layer, or a stack of a silicon oxide layer and a silicon nitride layer.

3. The liquid crystal display device having a display area and a non-display area according to claim 1, wherein the passivation layer includes a silicon oxide layer, a silicon nitride layer, or a stack layer of a silicon oxide layer and a silicon nitride layer.

4. The liquid crystal display device according to claim 1, wherein the light sensor is positioned adjacent to a data pad portion and a gate pad portion of the non-display area.

5. The liquid crystal display device according to claim 1, wherein the light sensor includes a single thin film transistor with the gate electrode and the source and drain electrodes.

6. A method of fabricating a liquid crystal display having a display area and a non-display area, the method comprising:
   forming a thin film transistor, a pixel electrode electrically connected with the thin film transistor, and a light sensor on a first substrate;
   providing a second substrate on which a color filter and a black matrix are formed;
   assembling a backlight, the first and second substrates, a support frame, and a top case to fabricate the LCD device, wherein brightness of the backlight is controlled by the light sensor;
   forming a liquid crystal layer between the first substrate and the second substrate; and
   forming a seal pattern on the outermost peripheral edge of the display area to securely attach the first substrate and the second substrate, wherein the liquid crystal layer is disposed inside the seal pattern and is not disposed over the light sensor, wherein the light sensor is formed on the first substrate in the non-display area to sense an intensity of an external light, wherein the light sensor includes a gate electrode formed on the first substrate, a gate insulating layer formed on the gate electrode, a semiconductor layer formed on and directly in contact with the gate insulation layer, source and drain electrodes formed on and directly in contact with the semiconductor layer and a passivation layer formed on the source and drain electrodes, wherein the light sensor is positioned outside the seal pattern, adjacent the black matrix, and exposed to an outside, wherein the drain electrode of the light sensor is connected with a light sensor pad and the light sensor pad is connected with a backlight driver to output a signal for controlling the brightness of the backlight, wherein the light sensor pad is formed of the same conductive material as the gate electrode or the source and drain electrodes and is formed of the same process as the gate electrode or the source and drain electrodes, wherein the second semiconductor layer comprises:
an active layer of amorphous silicon, and
an ohmic contact layer of impurity-doped amorphous silicon, wherein the light sensor is formed between the first substrate and the second substrate, and wherein the black matrix is formed on portions of the second substrate corresponding to both the non-display area and the display area.

7. A method of fabricating a liquid crystal display device, the method comprising:

defining a display area and a non-display area on a first substrate and a second substrate;

forming a light sensor on the first substrate in the non-display area, the light sensor outputting a signal based on an intensity of light;

forming a seal pattern on the first substrate or the second substrate in the non-display area; and attaching the first substrate and the second substrate using the seal pattern and forming a liquid crystal layer between the first and second substrates in the display area, wherein the seal pattern is formed on the outermost peripheral edge of the display area to securely attach the first substrate and the second substrate, wherein the liquid crystal layer is disposed inside the seal pattern and is not disposed over the light sensor, wherein the light sensor includes a gate electrode formed on the first substrate, a gate insulating layer formed on the gate electrode, a semiconductor layer formed on and directly in contact with the gate insulation layer, source and drain electrodes formed on and directly in contact with the semiconductor layer and a passivation layer formed on the source and drain electrodes, wherein the light sensor is positioned outside the seal pattern, adjacent the black matrix, and exposed to an outside, wherein the drain electrode of the light sensor is connected with a light sensor pad and the light sensor pad is connected with a backlight driver to output a signal for controlling the brightness of the backlight, wherein the light sensor pad is formed of the same conductive material as the gate electrode or the source and drain electrodes and is formed of the same process as the gate electrode or the source and drain electrodes, and wherein the second semiconductor layer comprises:
an active layer of amorphous silicon, and
an ohmic contact layer of impurity-doped amorphous silicon, wherein the light sensor is formed between the first substrate and the second substrate, and wherein the black matrix is formed on portions of the second substrate corresponding to both the non-display area and the display area.

\* \* \* \* \*